(12) United States Patent
Su et al.

(10) Patent No.: US 9,791,738 B2
(45) Date of Patent: Oct. 17, 2017

(54) METHOD AND BACKLIGHT MODULE THAT ACHIEVE HIGH COLOR SATUATIONOF LCD (LIQUID CRYSTAL DISPLAY) DEVICE

(71) Applicant: Shenzhen China Star Optoelectronics Technology Co., Ltd., Shenzhen, Guangdong (CN)

(72) Inventors: Zanjia Su, Guangdong (CN); Yongyuan Qiu, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 526 days.

(21) Appl. No.: 14/368,294

(22) PCT Filed: Apr. 22, 2014

(86) PCT No.: PCT/CN2014/075996
§ 371 (c)(1),
(2) Date: Jun. 23, 2014

(87) PCT Pub. No.: WO2015/149402
PCT Pub. Date: Oct. 8, 2015

(65) Prior Publication Data
US 2016/0313605 A1    Oct. 27, 2016

(30) Foreign Application Priority Data
Apr. 3, 2014 (CN) .......................... 2014 1 0134625

(51) Int. Cl.
*G02F 1/1335* (2006.01)
*F21V 8/00* (2006.01)

(52) U.S. Cl.
CPC ..... *G02F 1/133609* (2013.01); *G02B 6/0026* (2013.01); *G02F 1/133603* (2013.01);
(Continued)

(58) Field of Classification Search
CPC ......... G02F 1/133609; G02F 1/133605; G02B 6/0026; G02B 6/005; G02B 6/0073
See application file for complete search history.

(56) References Cited

U.S. PATENT DOCUMENTS

| | | | | |
|---|---|---|---|---|
| 5,737,045 | A * | 4/1998 | Abileah | G02F 1/133604 349/104 |
| 2008/0068533 | A1* | 3/2008 | Yun | G02F 1/133514 349/68 |
| 2008/0094528 | A1* | 4/2008 | Robinson | G02B 5/285 349/1 |

* cited by examiner

*Primary Examiner* — Mary Ellen Bowman
(74) *Attorney, Agent, or Firm* — Andrew C. Cheng

(57) ABSTRACT

The present invention relates to a method and a backlight module that achieve high color saturation of an LCD device. The backlight module that achieves high color saturation of the LCD device includes a notch filter. Light of backlighting of the backlight module is subjected to light filtering by the notch filter and then enters a liquid crystal cell of the LCD device. The notch filter has a cut-off central wavelength of 500-640 nanometers. The half peak width of the cut-off wave band is 10-120 nanometers. The notch filter has a thickness of 0.3-15 millimeters. The present invention also provides a method for achieving high color saturation of an LCD device. The present invention proposes a novel high color saturation technique that allows the color saturation to be increased at different extents in different backlighting and that may have NTSC reach 100% when used with an RG LED.

2 Claims, 3 Drawing Sheets

(52) U.S. Cl.
CPC ............ *G02B 6/005* (2013.01); *G02B 6/0068* (2013.01); *G02B 6/0073* (2013.01); *G02F 2001/133624* (2013.01); *G02F 2203/055* (2013.01)

METHOD AND BACKLIGHT MODULE THAT ACHIEVE HIGH COLOR SATUATIONOF LCD (LIQUID CRYSTAL DISPLAY) DEVICE

BACKGROUND OF THE INVENTION

1. Field of the Invention

The present invention relates to the liquid crystal display technology, and in particular to a method and a backlight module that achieve high color saturation of an LCD (Liquid Crystal Display) device.

2. The Related Arts

Due to the fast development of the OLED (Organic Light-Emitting Diode) technology, LCD faces a variety of challenges. Compared to OLED, LCD is relatively weak in respect of thinning, curvedness, and color saturation. To improve the performance of LCD for matching OLED, focus has been increasingly placed in these respects.

Color saturation of liquid crystal is also referred to as color gamut, which indicates the vividness of color displayed by a liquid crystal display and is an important parameter of liquid crystal products. Color saturation is represented by a percentage obtained with the triangular area delimited by the three primary colors of a display on the CIE (Commission international de l'eclairage) chormaticity diagram being the numerator and the triangular area delimited by the three primary colors defined by NTSC (the Notional Television System Committee) being the denominator. Regarding to the color saturation of liquid crystal, the known techniques make use of adjustment of a color filter (CF) mounted atop a TFT (thin-film transistor) liquid crystal cell or adoption of high saturation LED light source (such as an LED containing red and green fluorescent powder, an LED containing multiple color chips or using a quantum dot to serve as fluorescent powder) to achieve high color saturation (90% as defined by NTSC) of an LCD.

Theoretically, to achieve high color saturation is to expand the triangular area formed by color points of the pure colors (R, G, B) of an LCD as much as possible on the CIE chormaticity diagram in order to obtain an increased NTSC area. As shown in FIG. 1, a schematic view is given to demonstrate the behavior of RGB color points on the CIE chormaticity diagram for achieving high color saturation.

To expand the area formed by the color points of R, G, B of a module, two ways may be adopted. (1) For the spectra to which the color points of R, G, B of a module correspond, the half peak width can be reduced (so that the color coordinate can be made closer to the edges of the CIE chormaticity diagram); (2) The R wavelength that corresponds to the peak is made longer, the G wavelength closer to 520 nm, and the B wavelength shorter so that the area so formed is increased, namely NTSC gets higher and color saturation gets higher. Based on these two ways, the first way can be realized by increasing the thickness of the CF so as to reduce the half peak widths of R, G, B spectra, and further, the first and second ways can be simultaneously realized through adjustment of LED in order to improve color saturation.

In the known techniques, for the way of changing LED, an RG fluorescent powder included LED (an RG LED that contains two independent fluorescent emission peaks of R and G, a non-traditional YAG fluorescent emission being single peak) or a BR chip included LED (in addition to the blue chip traditionally contained in LED, a red chip being also contained), both can be integrated with the backlighting to combine with a conventional TFT cell (where for CF being not adjusted to work with the conventional backlighting, NTSC=72%), NTSC can reach 80-93%; however, it is not possible to achieve ultra-wide color gamut of 100%. Thus, further improvement is needed.

On the other hand, in the known techniques, a notch filter is capable of cut off a predetermined width for a given peak within the full band (namely the transmission of light is very close to zero in such a wave band), while the transmission rate in other bands remains high (namely the transmission rate >90%). Referring to FIG. 2, a transmission spectrum of a conventional notch filter is shown. It is observed that the cutoff center of the notch filter is 632.8 mm and the cutoff width is 30 nm.

SUMMARY OF THE INVENTION

Thus, an object of the present invention is to provide a method that achieves high color saturation of an LCD device so as to realize high color saturation of the LCD device.

Another object of the present invention is to provide a backlight module that achieves high color saturation of an LCD device so as to realize high color saturation of the LCD device.

To achieve the objects, the present invention provides a method for achieving high color saturation of an LCD (Liquid Crystal Display) device, wherein light of backlighting of the LCD device is subjected to light filtering by a notch filter and then enters a liquid crystal cell of the LCD device. The notch filter has a cut-off central wavelength of 500-640 nanometers. The cut-off wave band of the half peak width is 10-120 nanometers. The notch filter has a thickness of 0.3-15 millimeters.

The LCD device comprises a backlight module that is a side-edge backlight module or a direct backlight module.

The backlight module of the LCD device uses an RG LED (Light-Emitting Diode) or a YAG LED.

The present invention also provides a backlight module for achieving high color saturation of an LCD device, which comprises a notch filter, wherein light of backlighting of the LCD device is subjected to light filtering by the notch filter and then enters a liquid crystal cell of the LCD device. The notch filter has a cut-off central wavelength of 500-640 nanometers. The cut-off wave band of the half peak width is 10-120 nanometers. The notch filter has a thickness of 0.3-15 millimeters.

The backlight module comprises a side-edge backlight module or a direct backlight module.

The backlight module uses an RG LED or a YAG LED.

In the side-edge backlight module, the notch filter is selectively:

adhesively attached to a light exit surface of an LED;

adhesively attached to a light incident surface of a light guide plate that faces the LED;

positioned between a light exit surface of the LED and a light incident surface of the light guide plate;

positioned between the light guide plate and optical films;

positioned between any two optical films;

positioned on a topmost layer of the optical films; or adhesively attached to a surface of a liquid crystal cell that faces the optical films.

In the direct backlight module, the notch filter is selectively:

adhesively attached to a light exit surface of an LED;

adhesively attached to a light exit surface of a lens;

positioned on a lower surface of a diffuser plate;

positioned between the diffuser plate and an optical film assembly;

positioned between any two optical films;
positioned on a topmost layer of the optical films; or
adhesively attached to a surface of a liquid crystal cell that faces the optical films.

The present invention further provides a backlight module for achieving high color saturation of an LCD device, which comprises a notch filter, wherein light of backlighting of the LCD device is subjected to light filtering by the notch filter and then enters a liquid crystal cell of the LCD device, the notch filter having a cut-off central wavelength of 500-640 nanometers, the cut-off wave band of the half peak width being 10-120 nanometers, the notch filter having a thickness of 0.3-15 millimeters;

wherein the backlight module comprises a side-edge backlight module or a direct backlight module.

The backlight module uses an RG LED or a YAG LED.

In the side-edge backlight module, the notch filter is selectively:
adhesively attached to a light exit surface of an LED;
adhesively attached to a light incident surface of a light guide plate that faces the LED;
positioned between a light exit surface of the LED and a light incident surface of the light guide plate;
positioned between the light guide plate and optical films;
positioned between any two optical films;
positioned on a topmost layer of the optical films; or
adhesively attached to a surface of a liquid crystal cell that faces the optical films.

In the direct backlight module, the notch filter is selectively:
adhesively attached to a light exit surface of an LED;
adhesively attached to a light exit surface of a lens;
positioned on a lower surface of a diffuser plate;
positioned between the diffuser plate and an optical film assembly;
positioned between any two optical films;
positioned on a topmost layer of the optical films; or
adhesively attached to a surface of a liquid crystal cell that faces the optical films.

The efficacy of the present invention is that the present invention provides a method and a backlight module that achieve high color saturation of an LCD device, which propose a novel high color saturation technique that allows the color saturation to be increased at different extents in different backlighting.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

The present invention provides a method for achieving high color saturation of an LCD (Liquid Crystal Display) device, which allows light of backlighting of the LCD device to be subjected to filtering by a notch filter and then enter a liquid crystal cell of the LCD device. The notch filter has a cut-off central wavelength of 500-640 nanometers and the half peak width of the cut-off wave band is 10-120 nanometers. The notch filter has a thickness of 0.3-15 millimeters. In the transmission spectrum of the notch filter, the cut-off center position can be selected to be any value in the range of 500-640 nanometers, such as 600 nanometers. The half peak width of the cut-off wave band is 10-120 nanometers, such as 60 nanometers. The thickness of the notch filter is between 0.3-15 millimeters, such as 7 millimeters.

Figure 1:
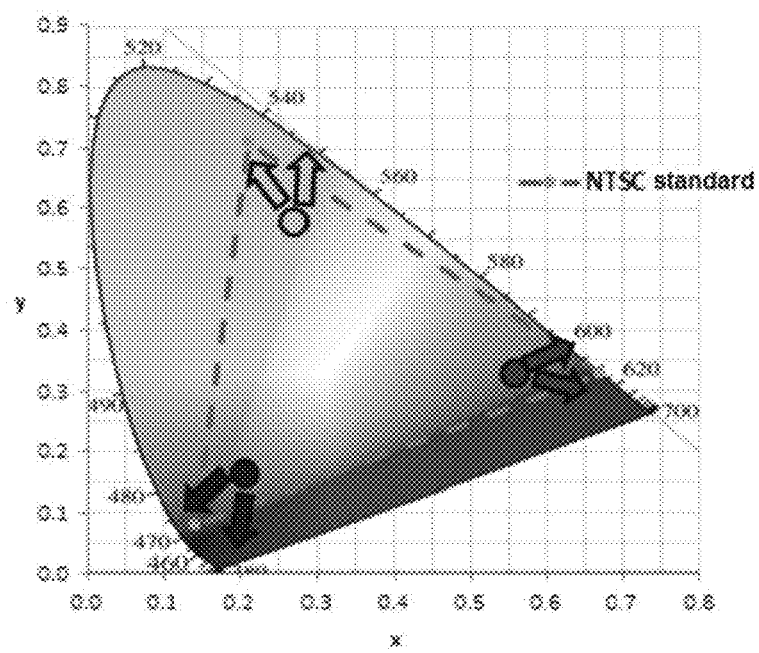
FIG. 1 is a schematic view demonstrating the behavior of RGB color points on the CIE chormaticity diagram for achieving high color saturation.
Figure 2:
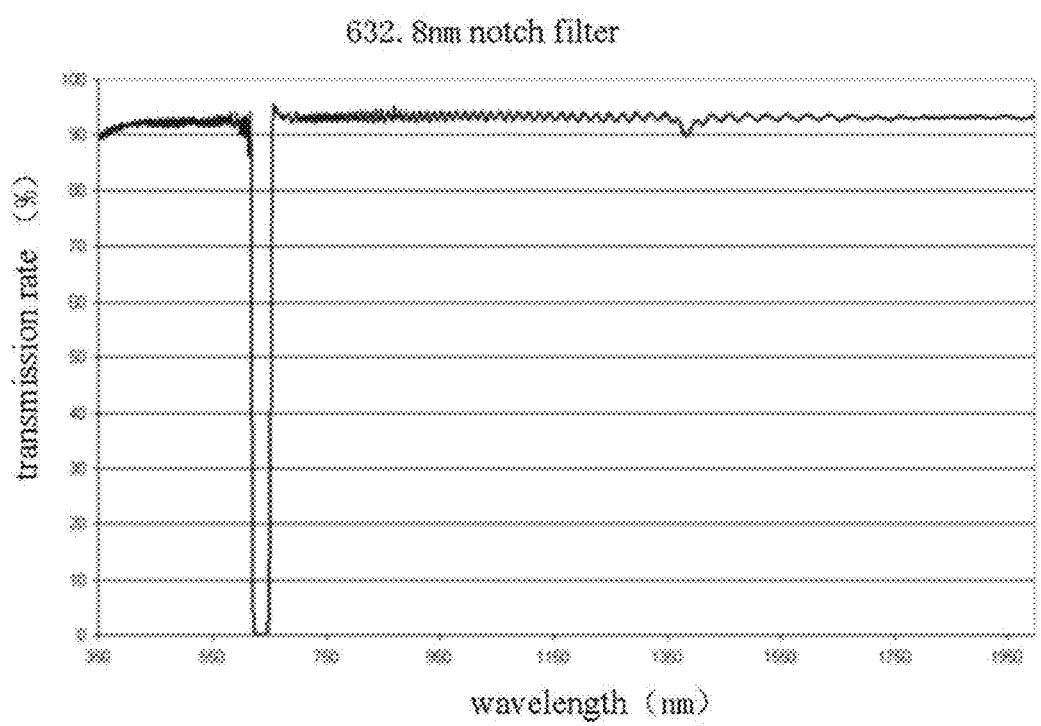
FIG. 2 shows a transmission spectrum of a conventional notch filter.

The present invention adopts light filtering with a notch filter to cut off a specific wave band of the spectrum of an LED to allow the R and G portions of the LED spectrum to show separate spectrum distributions (or narrower half peak widths), so as to enhance the color saturation of the LCD. For example, with the spectrum of a notch filter illustrated in FIG. 2, through proper adjustment of the position of the cut-off wave band, it is possible to provide a desired LED spectrum according to the present invention.

The method of the present invention is applicable to a side-edge backlight module or a direct backlight module, while allowing the backlight module of an LCD device to use different LEDs, such as an RG LED or a YAG LED.

Result of simulation for an LED used in combination with different parameters of notch filter:

TABLE 1

| | Use with YAG LED and Conventional Cell of 72% NTSC | | | | | | | | | |
|---|---|---|---|---|---|---|---|---|---|---|
| | | Notch Filter Cut-Off Center (nm) | | | | | | | | |
| | Without Notch Filter | 605 | 600 | 595 | 590 | 585 | 580 | 575 | 570 | 565 |
| Brightness of LED After Notch Filter (%) | 100 | 77 | 75 | 72 | 69 | 64 | 64 | 62 | 60 | 59 |
| NTSC (%) | 72 | 79 | 86 | 90 | 93 | 93 | 93 | 91 | 88 | 82 |

Using a conventional YAG LED in combination the notch filter and a conventional TFT cell allows NTSC to achieve a remarkable increase.

Figure 3:
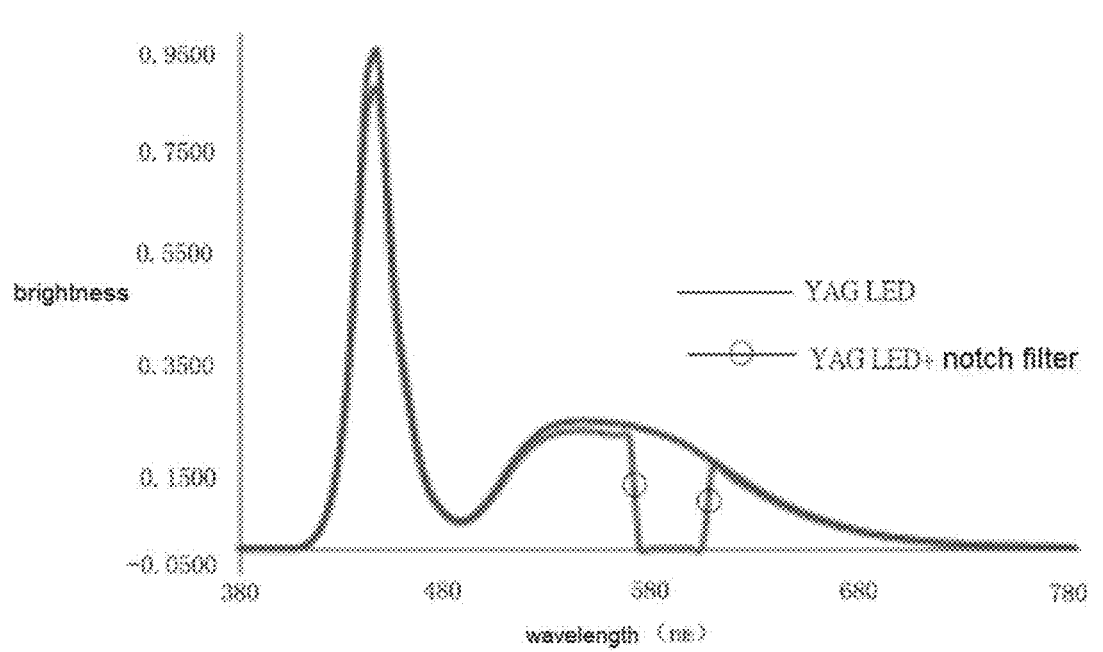
FIG. 3 is a schematic view illustrating comparison of spectrum for a YAG LED used in the present invention.

Referring to FIG. 3, which is a schematic view illustrating comparison of spectrum for a YAG LED used in the present invention (without notch filter and passing through a notch filter having a cut-off center of 585 nm), the spectra of the YAG LED before and after the notch filter are illustrated.

TABLE 2

Use with RG LED and Conventional Cell of 72% NTSC

| | Notch Filter Cut-Off Center (nm) | | | | | | | | |
|---|---|---|---|---|---|---|---|---|---|
| Without Notch Filter | 605 | 600 | 595 | 590 | 585 | 580 | 575 | 570 | 565 |
| Brightness of LED After Notch Filter (%) 100 | 79 | 78 | 78 | 77 | 76 | 75 | 73 | 70 | 67 |
| NTSC (%) 87 | 98 | 100 | 101 | 102 | 102 | 101 | 100 | 99 | 96 |

The present invention proposes a novel high color saturation technique, which uses an RG fluorescent powder LED and a notch filter in combination with a conventional TFT cell to make NTSC reach 100%.

Figure 4:
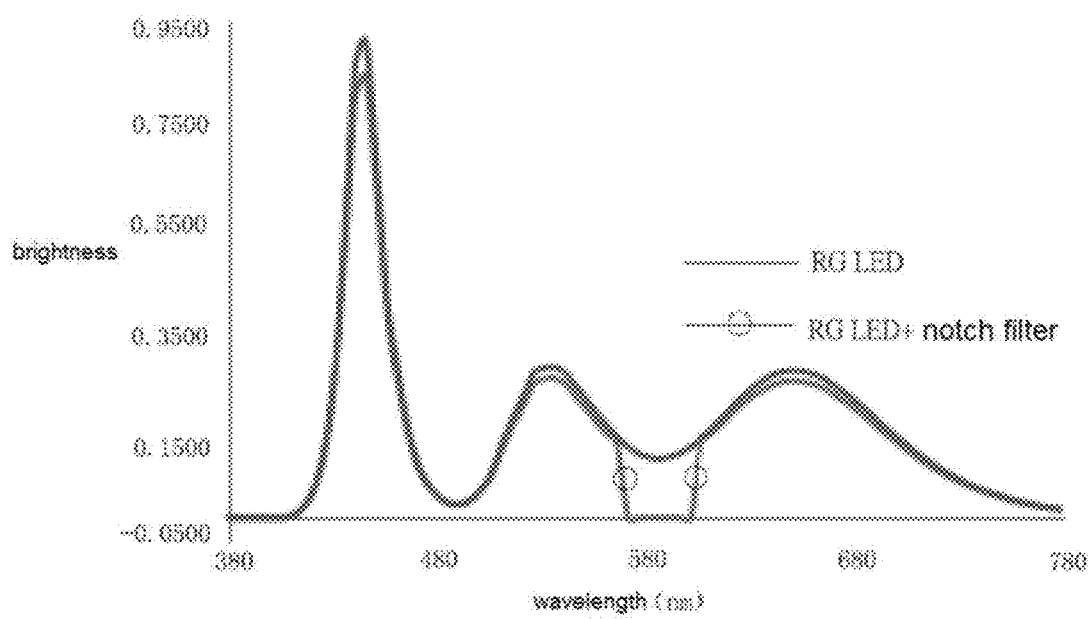
FIG. 4 is a schematic view illustrating comparison of spectrum for an RG LED used in the present invention.

Referring to FIG. 4, which is a schematic view illustrating comparison of spectrum for a RG LED using the present invention (without notch filter and passing through a notch filter having a cut-off center of 585 nm), the spectra of the RG LED before and after the notch filter are illustrated.

It can be found from the result of simulation that after the inclusion of a notch filter, the brightness of an LED may have loss of different degrees, but the color saturation of the LCD can be remarkably improved and may even reach NTSC 100% when an RG LED is used. The present invention provides a high color saturation backlight solution that requires not particular design of color filter. According to the present invention, through using different LEDs and adjusting the cut-off central wavelength and half peak width of the notch filter, it is possible to achieve increase of NTSC and may even achieve NTSC>100% when used with an RG LED (together with a traditional cell).

Correspondingly, the present invention also provides a backlight module that achieves high color saturation of an LCD device. The backlight module comprises a notch filter and light of backlighting of the backlight module is subjected to light filtering by the notch filter and then enters a liquid crystal cell of the LCD device. The notch filter has a cut-off central wavelength of 500-640 nanometers and the half peak width of the cut-off wave band is 10-120 nanometers. The notch filter has a thickness of 0.3-15 millimeters. The backlight module may use an RG LED or a YAG LED.

The backlight module of the present invention can be a side-edge backlight module or a direct backlight module, and can be applied to various known backlight modules.

Figure 5:
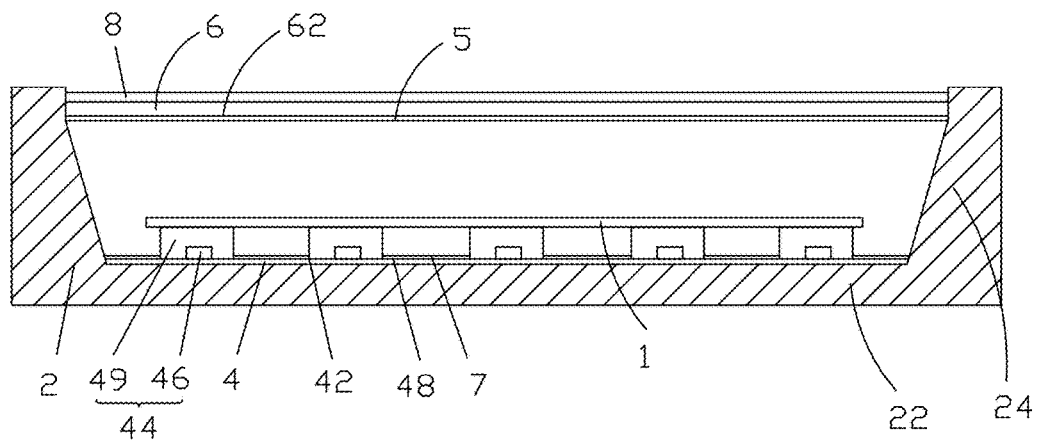
FIG. 5 is a schematic view showing the structure of a preferred embodiment of a backlight module that achieves high color saturation of an LCD device according to the present invention.

Referring to FIG. 5, a schematic view is given to show the structure of a preferred embodiment of a backlight module that achieves high color saturation of an LCD device according to the present invention. In the preferred embodiment, a direct backlight module is used. The direct backlight module comprises: a backplane 2, a backlight source 4 mounted in the backplane 2 and a diffuser plate 6 mounted on the backplane 2 and located above the backlight source 4, and a notch filter 1.

The backlight source 4 comprises a plurality of LED light bars 42. Each of the LED light bars 42 comprises a plurality of LED lights 44. Preferably, the plurality of LED lights 44 is arranged to be spaced from each other by a fixed interval. Each of the LED lights 44 comprises a light emission chip 46. The diffuser plate 6 comprises a light incident surface 62 opposing the backlight source. The light incident surface 62 of the diffuser plate 6 is coated with a fluorescent powder layer 5. Light emitting from the LED lights 44 excites the fluorescent powder layer 5 to give off light. The light emitting from excitation of the fluorescent powder layer 5 is mixed with a portion of the light emitting from the LED lights 44 to form white light required by the backlight source 4. The LED lights 44 each comprise a frame (not shown), a light emission chip 46 mounted in the frame, and packaging resin 49 that packages the light emission chip 46 in the frame, wherein the packaging resin 49 comprises epoxy resin.

The backlight source 4 further comprises a PCB (Printed Circuit Board) 48 mounted in the backplane 2 and the plurality of LED lights 44 is mounted on and electrically connected with the PCB 48. The backplane 2 comprises a bottom board 22 and a side board 24 connected to the bottom board 22. The LED light bars 42 are mounted to the bottom board 22 of the backplane 2. The direct backlight module further comprises: a reflector plate 7 arranged between the bottom board 22 of the backplane 2 and the LED light bars 42 and an optical film assembly 8 arranged on the diffuser plate 6. Light emitting from the backlight source 4 directly enters or is reflected by the reflector plate 7 to enter the fluorescent powder layer 5 to mix and form white light required by the backlight source and then enters the diffuser plate 6 to eventually pass through the optical film assembly 8 to form a uniform planar light source. In the preferred embodiment, the notch filter 1 can be selectively and adhesively attached to a light exit surface of the LED lights 44. Further, the notch filter can also, selectively:

be adhesively attached to a light exit surface of a lens (LED lens);

be positioned on a lower surface of the diffuser plate;

be positioned between the diffuser plate and the optical film assembly;

be positioned between any two optical films;

be positioned on a topmost layer of the optical films; or be attached to a surface of a liquid crystal cell that faces the optical films.

Figure 6:
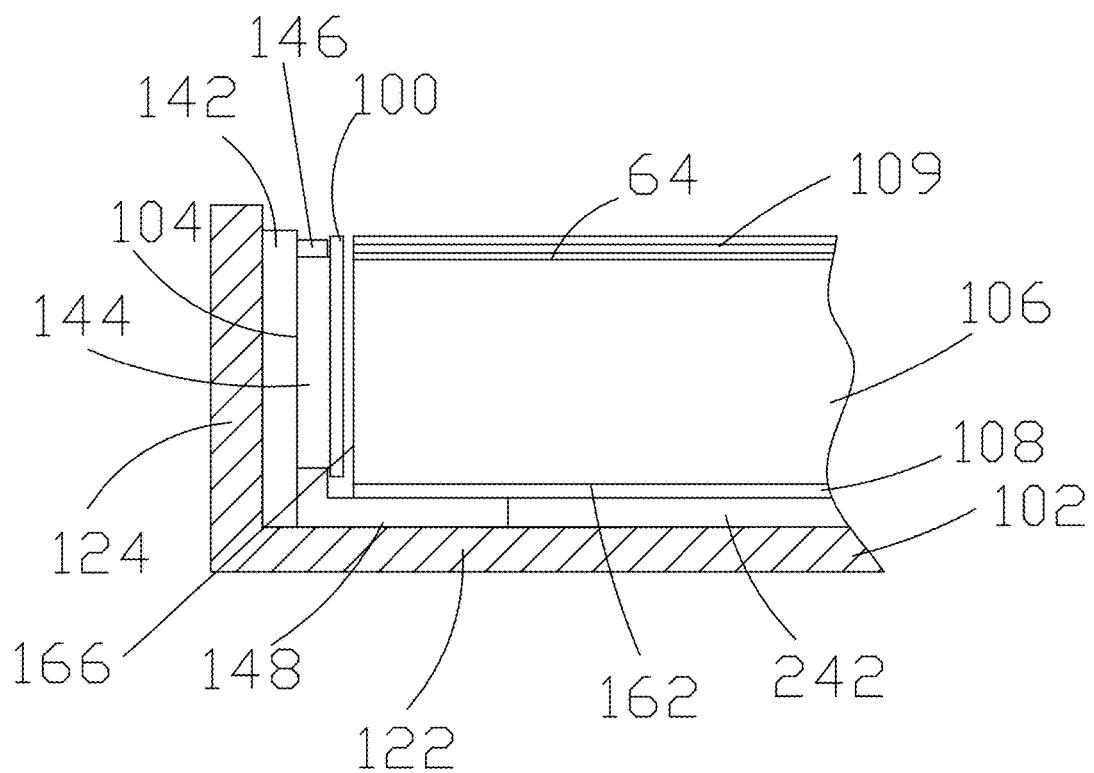
FIG. 6 is a schematic view showing the structure of another preferred embodiment of a backlight module that achieves high color saturation of an LCD device according to the present invention.

Referring to FIG. 6, a schematic view is given to show the structure of another preferred embodiment of a backlight module that achieves high color saturation of an LCD device according to the present invention. In the preferred embodiment, a side-edge backlight module is used. The side-edge backlight module, comprises: a backplane 102, a backlight source 104 mounted in the backplane 102, a light guide plate 106 mounted in the backplane 102, a reflector plate 108 arranged between the light guide plate 106 and the backplane 102, and an optical film assembly 109 arranged on the light guide plate 106. The backlight source 104 comprises a circuit board 142, a plurality of LED lights 144 mounted to and electrically connected with the circuit board 142, a plurality of vertical heat dissipation fins 146 mounted to the circuit board 142 and located between the LED lights 144, and horizontal heat dissipation plates 148 perpendicularly connected to the vertical heat dissipation fins 146. The horizontal heat dissipation plates 148 are mounted to the backplane 102.

The backplane 102 comprises a bottom board 122 and a plurality of side boards 124 perpendicularly connected to the bottom board 122. The bottom board 122 and the side boards 124 delimit a receiving space 242. The backlight source 104 and the light guide plate 106 are received in the receiving space 242. The light guide plate 106 comprises a bottom surface 162 facing the bottom board 122 of the backplane 102, a top surface 164 opposite to the bottom surface 162, and a plurality of side surfaces connecting between the bottom surface 162 and the top surface 164. The plurality of side surface comprises at least a light incident surface 166. The circuit board 142 of the backlight source 104 is securely mounted to the side board 124 to correspond to the light incident surface 166. The horizontal heat dissipation plates 148 are mounted to the bottom board 122 of the backplane 102. In the preferred embodiment, the notch filter 100 is selectively and adhesively attached to a light exit surface of the LED lights 144. Further, the notch filter can also, selectively:

be adhesively attached to the light incident surface of the light guide plate that faces the LED;

be positioned between the light exit surface of the LED and the light incident surface of the light guide plate;

be positioned between the light guide plate and the optical films;

be positioned between any two optical films;

be positioned on a topmost layer of the optical films; or be attached to a surface of a liquid crystal cell that faces the optical films.

The present invention provides a method and a backlight module that achieve high color saturation of an LCD device, which propose a novel high color saturation technique that allows the color saturation to be increased at different extents in different backlighting and that may have NTSC reach 100% when used with an RG LED.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module for achieving high color saturation of an LCD (Liquid Crystal Display) device, comprising a notch filter, wherein light of backlighting of the LCD device is subjected to light filtering by the notch filter and then enters a liquid crystal cell of the LCD device, the notch filter having a cut-off central wavelength of 500-640 nanometers, the cut-off wave band of the half peak width being 10-120 nanometers, the notch filter having a thickness of 0.3-15 millimeters;

wherein the backlight module of the LCD device comprises YAG LED (Light-Emitting Diode);

wherein the backlight module comprises a backplane that comprises bottom board and a side board connected to the bottom board to define a receiving space, wherein a backlight source that is operable to emit the backlighting and the notch filter by which the backlighting is filtered before entering the liquid crystal cell of the LCD device are received in the receiving space;

wherein the backlight source comprises a plurality of LED light bars each of which comprises a plurality of LEDs distributed along the light bar at a fixed interval to emit the backlighting, the LEDs comprising the YAG LED; and wherein a diffuser plate is mounted to the side board of the backplane and the notch filter is arranged in the receiving space at a location on or above the backlight source.

2. The backlight module for achieving high color saturation of the LCD device as claimed in claim 1 wherein in the direct backlight module, the notch filter is selectively:

adhesively attached to a light exit surface of the LEDs;

adhesively attached to a light exit surface of a lens;

positioned on a lower surface of the diffuser plate;

positioned between the diffuser plate and an optical film assembly mounted on the diffuser plate;

positioned between any two optical films of the optical film assembly;

positioned on a topmost layer of the optical film assembly; or adhesively attached to a surface of the liquid crystal cell that faces the optical film assembly.

* * * * *